[19] United States Patent
Petillo

[11] 4,168,647
[45] Sep. 25, 1979

[54] ADJUSTABLE PICKUP

[76] Inventor: Phillip J. Petillo, 1206 Herbert Ave., Ocean, N.J. 07712

[21] Appl. No.: 812,101

[22] Filed: Jul. 25, 1977

[51] Int. Cl.$^2$ .......... G10H 3/00
[52] U.S. Cl. .......... 84/1.14; 84/1.16
[58] Field of Search .......... 84/1.01, 1.04, 1.06, 84/1.14–1.16, DIG. 12, 267, 269, 313; 73/431; 324/144–151

[56] References Cited

U.S. PATENT DOCUMENTS

| | | | |
|---|---|---|---|
| 3,725,561 | 4/1973 | Paul | 84/1.15 |
| 3,743,751 | 7/1973 | Ibanez | 84/1.16 |
| 3,780,202 | 10/1973 | Law | 84/1.04 |
| 3,911,777 | 10/1975 | Rendell | 84/1.16 |

*Primary Examiner*—Vit W. Miska

[57] ABSTRACT

An electronic sensing device for use with resonating musical instruments is disclosed which includes a housing having control units, a bracket for holding the housing on the stringed instrument, an electronic sensor unit of the type such as a piezoelectric pickup, and a telescoping and pivoting arm joining the pickup to the housing.

8 Claims, 5 Drawing Figures

ADJUSTABLE PICKUP

BACKGROUND OF THE INVENTION

1. Field of the Invention

This invention relates to electronic sensors and pertains in particular to those which are used on musical instruments of the resonating type.

2. Description of the Prior Art

Stringed instruments such as guitars and the like often use electronic sensors to amplify the sounds of the instrument as it is played. Such devices are commonly called pickups or transducers and are best mounted on the instrument where vibration is greatest. The point of strongest vibration, however, often differs from instrument to instrument so pickups must be capable of mounting at a variety of points.

Accordingly, a broad object of this invention is to achieve flexibility in pickup location on the instrument.

Heretofore, it has been customary to construct the pickup in a unitary structure so that once it is mounted it can not thereafter be readily moved. Many times, however, it is desirable to move the pickup after it has been mounted.

Accordingly, another object of this invention is to achieve a pickup which can have it's point of contact readily relocated after installation.

The quality of electronically reproduced sound is often effected by the amount of force exerted between the sensing part of the pickup and the instrument surface. It is desirable, therefore, to have the ability to change the amount of force as desired.

Accordingly, another object of this invention is to achieve adjustability in the amount of force exerted between the pickup sensing element and the surface of the stringed musical instrument.

SUMMARY OF THE INVENTION

In accordance with the preferred embodiment of this invention, the housing portion of the pickup is rigidly attached to the stringed instrument but the sensor portion is adjustable with respect to the housing in order to achieve flexibility in contact location.

In accordance with one feature of this invention, the sensor portion is mounted at the end of a telescoping arm in order to achieve location flexibility in the direction of arm extension.

In accordance with another feature of this invention, the telescoping arm is mounted to pivot laterally with respect to the surface of the instrument to further facilitate flexibility in mounting location.

In accordance with another feature of this invention, the telescoping arm is mounted to pivot vertically with respect to the surface of the instrument to facilitate adjustment in the pressure exerted between the sensing portion of the pickup and the surface of the instrument.

These and other objects and features of the invention will be more readily understood by reference to the following drawing and detailed description.

DETAILED DESCRIPTION OF THE INVENTION

Figure 1:
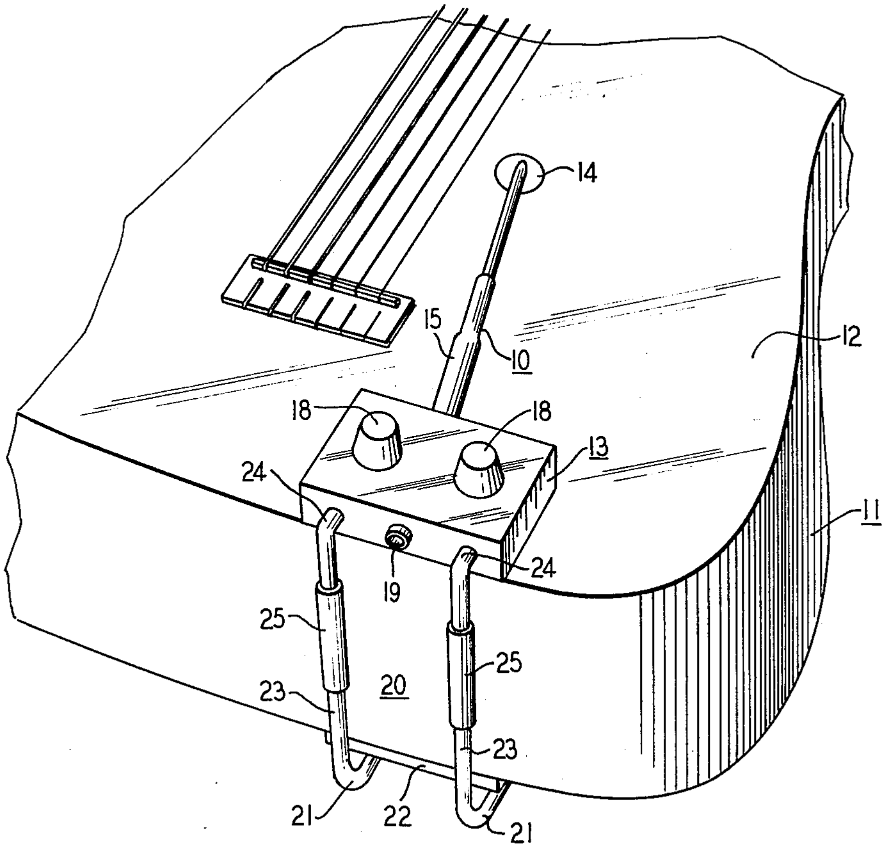
FIG. 1 is a perspective view of a portion of a stringed instrument having attached thereto a pickup made in accordance with this invention.

Referring to FIG. 1 an electronic sensing device or pickup 10 is disclosed which is mounted on an instrument 11. In the illustration, the instrument 11 is a guitar and the pickup 10 mounts on the upper surface 12 thereof.

Figure 3:
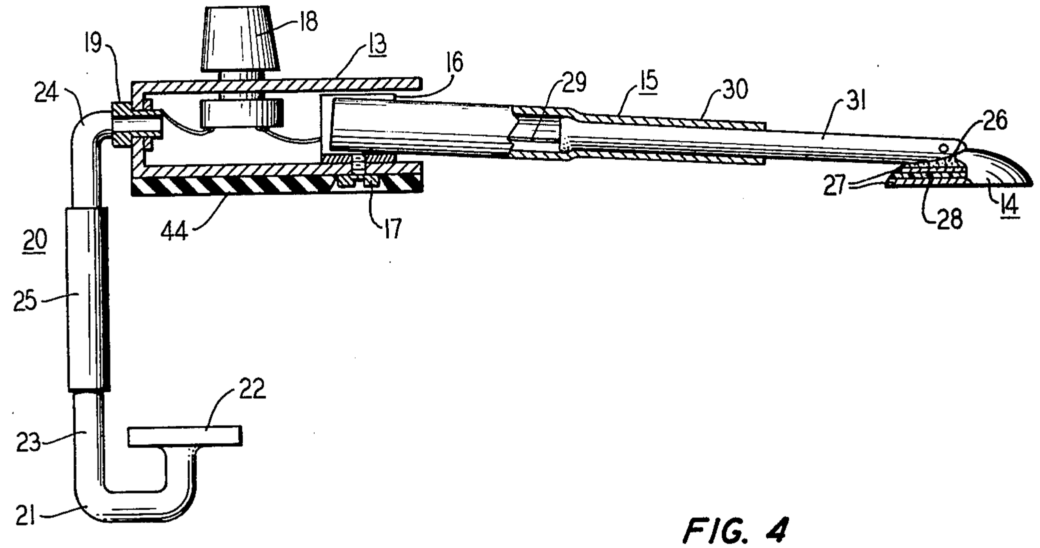
FIG. 3 is a side elevation view of the pickup shown in FIG. 2 taken in section along the lines 3—3.

The pickup 10 comprises a housing 13, a sensor 14 and an arm 15 linking the sensor 14 and the housing 13. The housing 13 is advantageously made of steel or brass and is slotted at one end to accommodate the arm 15 and pivoting movement thereof. As best seen in FIG. 3, the arm 15 is joined to the housing 13 by a bracket 16. The bracket 16 is advantageously made of steel or brass, is U-shaped on top to accommodate the arm 15 and is pivotally mounted to the housing 13, as, for example, by a bolt 17.

In addition, the housing 13 includes electronic controls 18 and a jack 19. The controls 18 are typical potentiometers and the jack 19 is adapted to accommodate a conventional plug (not shown). Finally, the housing 13 may advantageously include a clamp assembly 20.

In the embodiment illustrated, the clamp assembly 20 comprises a rod 21 bent at one end to form a seat for a pad 22, two parallel central leg portions 23 and two L-shaped feet 24. The feet 24 are rigidly attached to the housing 13 as by welding or the like and the central leg portions 23 include adjusting means 25 which operate, for example, like a turn buckle to adjust the space between the housing 13 and the pad 22. While not favored, the clamp assembly 20 can be replaced by direct attachment to the instrument 11. In use, the adjusting means 25 is regulated until the instrument 11 is firmly clamped between the housing 13 and the pad 22.

Figure 5:
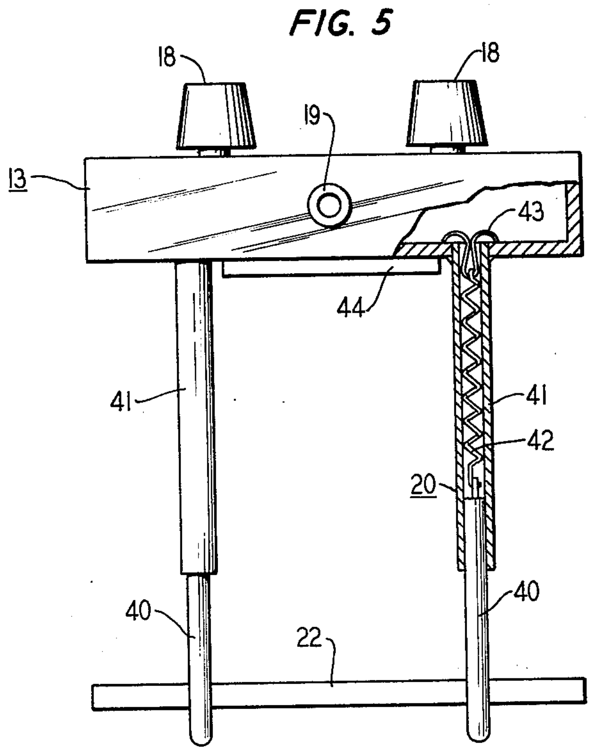
FIG. 5 is an end elevation view of the pickup shown in FIG. 2 taken in section along the line 5—5 and illustrating an alternate form of clamp assembly.

An alternate form of the clamp assembly 20 is illustrated in FIG. 5. In the embodiment illustrated, the pad 22 is held by a pair of lower rods 40, a pair of upper rods 41, and a pair of springs 42. The lower rods 40 are L-shaped and may be advantageously made from stainless steel or the like. The upper rods 41 may also be made of stainless steel or the like and are hollow and rigidly attached to the housing assembly 13 as by welding or the like. The hollow upper rods 41 slidably accommodate the rods 40 and springs 42 which are joined at one end to the rods 40 and at the other to a holding device 43 which may be a cotter pin or the like.

In the foregoing embodiment, the upper rods 41 are stationary and adjustment of the clamping force is automatic. Consequently, the upper rods 41 will not move against the end surface of the instrument 11 thereby preventing it from being marred in use. Finally, the housing assembly 13 may also be equipped with mounting pads 44 which will protect the surface 12 and advantageously assist in biasing the sensor 14 against the instrument surface 12 when appropriate.

In the embodiment illustrated, the sensor 14 is piezoelectric but may also be any other type of sensing device. Advantageously it comprises, as best seen in FIG. 3, a piezoelectric element 26 and two substraight elements 27 separated by a spacer 28 made of mica, paper, or similar materials. The whole assembly is advantageously encapsulated in a material and electrical leads 29 are attached to the piezoelectric element 26, the controls 18 and the jack 19 as appropriate.

Figure 2:
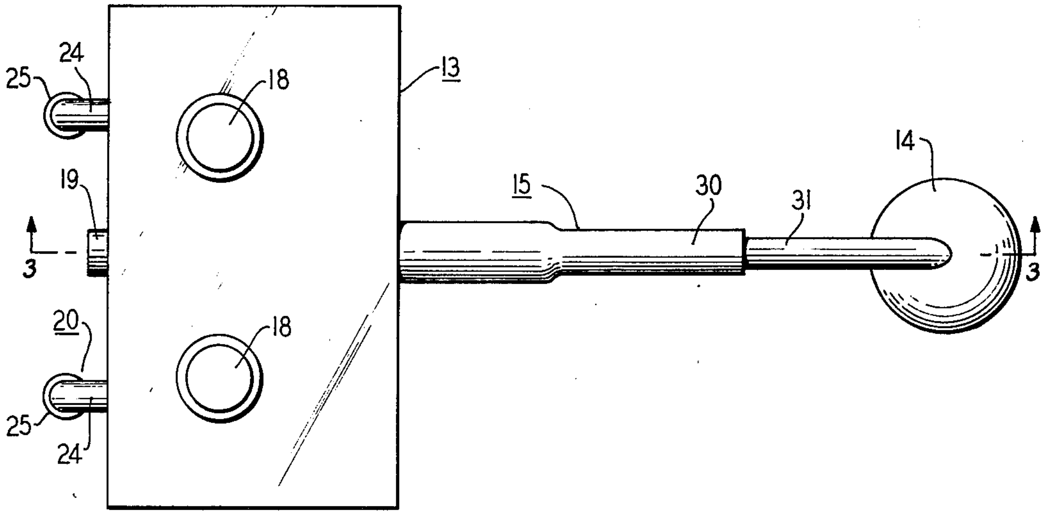
FIG. 2 is a plan view of the pickup illustrated in FIG. 1.

As illustrated in the embodiments disclosed, the arm 15 comprises an outer leg 30 and inner leg 31. Both legs are made of tubular metal such as brass or stainless steel and the inner is adapted to slide in and out of the outer. As best seen in FIGS. 2 and 3, the outer leg 30 is rigidly attached to the bracket 16 as by welding or the like so that it is free to pivot with the bracket 16 laterally with respect to the surface 12 of the instrument 11.

In use, the pickup 10 is positioned on the instrument 11 and then locked in place by the clamp assembly 20. Thereafter, further positioning of the sensor 14 is obtained by pivoting the arm 15, sliding the inner leg 31 into or out of the outer leg 30 or both. Advantageously, the outer leg 30 has been attached to the bracket 16 so that it depends downwardly at a slight angle towards the surface 12. As a result, a pressure will be exerted between the surface 12 and the sensor 14 to insure good mechanical contact.

Figure 4:
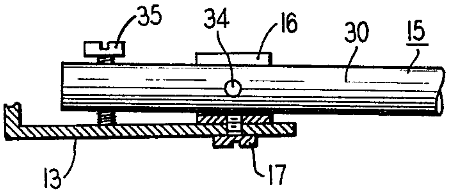
FIG. 4 is a fragmentary view of a portion of a pickup arm attached to the instrument in an alternative arrangement.

Referring to FIG. 4, an alternative design is shown in which the outer leg 30 is pivotally attached to the bracket 16 by the pin 34. The outer leg 30 further includes an adjusting post 35 which may be advantageously a tapped screw. With this arrangement, the amount of pressure exerted by the sensor 14 against the surface 12 can readily be adjusted merely by setting the adjusting post 35 to a desired height or presetting in manufacturing.

In summary, an electronic pickup has been disclosed which achieves wide flexibility in sensor location. While only the embodiments illustrated are described, it will be recognized that other embodiments falling within the scope of the invention will readily occur to those skilled in the art.

What I claim is:

1. An electronic transducing device for detecting the sound signals emitted from a stringed instrument comprising:

a housing having attaching means for ridgidly affixing said housing on said instrument;

an electronic sensor adapted to engage the surface of said instrument and detect and transmit sound signals emanating therefrom, and support means linking said housing and said electronic sensor, said support means comprising a bracket pivotly attached to said housing and a rigid telescoping assembly attached to said bracket at one end and to said electronic sensor at the other end whereby said electronic sensor can be located along the line of extension of said telescopic assembly.

2. The combination in accordance with claim 1 wherein said telescoping assembly comprises two tubular members mounted one inside the other.

3. The combination in accordance with claim 1 wherein said electronic sensor comprises a piezoelectric element.

4. The combination in accordance with claim 1 wherein said telescoping assembly is pivotly attached to said bracket to rotate vertically with respect to the top surface of said instrument and includes adjusting means for pivoting said telescoping assembly on said bracket.

5. The combination in accordance with claim 4 wherein said bracket is located between said adjusting means and said electronic sensor whereby adjustment of said adjusting means will urge said sensor closer or further away from the surface of said instrument.

6. An electronic transducing device for detecting the sound signals emitted from a stringed instrument comprising:

a housing having attaching means for rigidly affixing said housing on said instrument, said attaching means comprising a clamp attached to said housing at one end, attached to a spacer pad at the other end and having central spacing means for adjusting the distance between said housing and said pad, said housing resting on one side of said instrument and said pad resting on the other side of said instrument whereby a gripping action results when said spacer means is adjusted to draw said housing and pad closer together;

an electronic sensor adapted to engage a surface of said instrument and detect and transmit sound signals emanating therefrom, and support means linking said housing and said electronic sensor, said support means being pivotly attached to said housing so as to rotate laterally with respect to the top surface thereof whereby the lateral location of said sensor on said instrument can be changed by pivoting said support means.

7. The combination in accordance with claim 6 wherein said central spacing means comprises biasing means, hollow upper rods, lower rods slidably mounted in the upper rods and attached to said pad and said biasing means so as to be urged into said upper rods.

8. The combination in accordance with claim 7 wherein said biasing means comprises a pair of springs wherein each spring joins an upper rod to a lower rod.

* * * * *